United States Patent
Ye

(10) Patent No.: US 11,914,826 B2
(45) Date of Patent: Feb. 27, 2024

(54) TOUCH DISPLAY PANEL AND DISPLAY DEVICE

(71) Applicant: WUHAN CHINA STAR OPTOELECTRONICS SEMICONDUCTOR DISPLAY TECHNOLOGY CO., LTD., Wuhan (CN)

(72) Inventor: Jian Ye, Wuhan (CN)

(73) Assignee: WUHAN CHINA STAR OPTOELECTRONICS SEMICONDUCTOR DISPLAY TECHNOLOGY CO., LTD., Wuhan (CN)

( * ) Notice: Subject to any disclaimer, the term of this patent is extended or adjusted under 35 U.S.C. 154(b) by 375 days.

(21) Appl. No.: 17/296,220

(22) PCT Filed: Apr. 19, 2021

(86) PCT No.: PCT/CN2021/088129
§ 371 (c)(1),
(2) Date: May 21, 2021

(87) PCT Pub. No.: WO2022/217624
PCT Pub. Date: Oct. 20, 2022

(65) Prior Publication Data
US 2023/0315238 A1 Oct. 5, 2023

(30) Foreign Application Priority Data
Apr. 12, 2021 (CN) .......................... 202110386375.6

(51) Int. Cl.
*G06F 3/044* (2006.01)
*G06F 3/041* (2006.01)

(52) U.S. Cl.
CPC .......... *G06F 3/0446* (2019.05); *G06F 3/0412* (2013.01); *G06F 2203/04111* (2013.01); *G06F 2203/04112* (2013.01)

(58) Field of Classification Search
CPC ................. G06F 3/0446; G06F 3/0412; G06F 2203/04111; G06F 2203/04112
(Continued)

(56) References Cited

U.S. PATENT DOCUMENTS

| 9,151,790 B1 | 10/2015 | Hoshtanar |
| 2012/0098760 A1 | 4/2012 | Chuang |

(Continued)

FOREIGN PATENT DOCUMENTS

| CN | 105425992 A | 3/2016 |
| CN | 108089760 A | 5/2018 |

(Continued)

OTHER PUBLICATIONS

Chinese Office Action in corresponding Chinese Patent Application No. 202110386375.6 dated May 6, 2022, pp. 1-7.
(Continued)

*Primary Examiner* — Mark Edwards
(74) *Attorney, Agent, or Firm* — PV IP PC; Wei Te Chung; Zhigang Ma

(57) ABSTRACT

The present application provides a touch display panel and a display device. A plurality of touch units of the touch display panel includes a plurality of first electrode sets, a plurality of second electrode sets, and dummy electrodes. The first electrode sets include a plurality of first electrodes, the second electrode sets include a plurality of second electrodes. The first electrodes, the second electrodes, and the dummy electrodes are disposed insulatively from one another. The dummy electrodes are disposed in dummy
(Continued)

electrode regions surrounded and formed by the first electrode sets and the second electrode sets.

20 Claims, 12 Drawing Sheets

(58) Field of Classification Search
USPC .......................................................... 345/174
See application file for complete search history.

(56) References Cited

U.S. PATENT DOCUMENTS

| | | | | |
|---|---|---|---|---|
| 2016/0117031 | A1* | 4/2016 | Han | G06F 3/0412 |
| | | | | 345/174 |
| 2018/0120973 | A1* | 5/2018 | Nakamura | G06F 3/04164 |
| 2019/0056820 | A1 | 2/2019 | Hoch | |
| 2019/0220123 | A1* | 7/2019 | Kanaya | H10K 59/40 |
| 2020/0033976 | A1 | 1/2020 | Yin | |
| 2020/0111844 | A1* | 4/2020 | Jing | G06F 3/0445 |
| 2022/0197418 | A1* | 6/2022 | Liu | H10K 59/40 |
| 2022/0197439 | A1* | 6/2022 | He | G06F 3/0412 |

FOREIGN PATENT DOCUMENTS

| | | |
|---|---|---|
| CN | 108196736 A | 6/2018 |
| CN | 208126362 U | 11/2018 |
| CN | 110456943 A | 11/2019 |
| CN | 110865737 A | 3/2020 |
| CN | 111782089 A | 10/2020 |
| CN | 112162650 A | 1/2021 |
| CN | 112433648 A | 3/2021 |
| EP | 2104023 A2 | 9/2009 |
| JP | 2013171454 A | 9/2013 |
| KR | 20150017123 A | 2/2015 |
| WO | 2016106810 A1 | 7/2016 |

OTHER PUBLICATIONS

International Search Report in International application No. PCT/CN2021/088129 , dated Jan. 14, 2022.

Written Opinion of the International Searching Authority in International application No. PCT/CN2021/088129 , dated Jan. 14, 2022.

* cited by examiner

TOUCH DISPLAY PANEL AND DISPLAY DEVICE

RELATED APPLICATIONS

This application is a Notional Phase of PCT Patent Application No. PCT/CN2021/088129 having international filing date of Apr. 19, 2021, which claims the benefit of priority of Chinese Patent Application Nos. 202110386375.6 filed on Apr. 12, 2021. The contents of the above applications are all incorporated by reference as if fully set forth herein in their entirety.

FIELD OF INVENTION

The present application relates to a field of displays, especially to a touch display panel and a display device.

BACKGROUND OF INVENTION

With development of display technologies, touch display panels are more and more commonly used in electrical devices such as tablets, smartphones, etc. A conventional touch display panel mainly employs indium tin oxide (ITO) conductive film as a material of a touch electrode. Such touch display panel has disadvantages such as high prices, great resistances, poor flexibility, etc. The advent of metal grid technologies makes up for the defects of the above-mentioned ITO touch electrode.

At present, rigid glass of a protect cover lid of an electrical device is replaced with super-thin glass, which therefore lowers a thickness of the protect cover lid. When a user touches an electrical device, the electrical device is in a floating ground state. Because an interval between a finger and the touch electrode becomes smaller such that a capacitance formed between the finger and the touch electrode becomes greater. In the meantime, charge signals transmitted through the finger to the ground are decreased such that capacitance variance occurring when the user touches the electrical device is decreased, which results in a technical issue of touch failure on the touch display panel.

Therefore, there is an urgent need for a touch display panel to solve the above technical issue.

SUMMARY OF INVENTION

Technical Issue

The present application provides a touch display panel and a display device to ease a technical issue of touch failure appearing on conventional touch display panel.

Technical Solution

The present application provides a touch display panel, comprising a plurality of touch units, the touch units comprising:

a plurality of first electrode sets, the first electrode sets arranged along a first direction and extending along a second direction, each of the first electrode sets comprising a plurality of first electrodes electrically connected to one another, and the first electrodes extending along the first direction and the second direction;

a plurality of second electrode sets, the second electrode sets arranged along the second direction and extending along the first direction, each of the second electrode sets comprising a plurality of second electrodes electrically connected to one another, the second electrodes extending along the first direction and the second direction, and the second electrodes disposed insulatively from the first electrodes; and dummy electrodes, the dummy electrodes disposed insulatively from the first electrodes and the second electrodes;

wherein the first electrode sets and the second electrode sets surround and form a plurality of dummy electrode regions, the dummy electrodes are disposed in the dummy electrode regions respectively.

In the touch display panel of the present application, the touch units are disposed along the first direction and the second direction;

in the first direction, the first electrodes in adjacent two of the touch units are disposed insulatively from each other, and the second electrodes in adjacent two of the touch units are electrically connected to each other; and in the second direction, the second electrodes in adjacent two of the touch units are disposed insulatively from each other, and the first electrodes in adjacent two of the touch units are electrically connected to each other.

In the touch display panel of the present application, each of the touch units comprises:

at least one of the first electrodes, the first electrode dividing the touch unit into a plurality of function regions;

at least one of the second electrodes, the second electrode disposed in the function regions; and a plurality of first dummy sub-electrodes, the first dummy sub-electrodes disposed in the function regions;

wherein the first dummy sub-electrodes are disposed away from the first electrode, the second electrode is disposed near the first electrode, and the second electrode is disposed between the first dummy sub-electrodes and the first electrode.

In the touch display panel of the present application, the first electrode comprises a plurality of first branch electrodes extending along the first direction and the second direction, the first branch electrodes are electrically connected to one another, and the first branch electrodes divide the touch unit into the function regions;

the second electrode comprises a plurality of second branch electrodes, the second branch electrodes are disposed opposite to and insulated from the first branch electrodes, at least one of the second branch electrodes disposed along the first direction and at least one of the second branch electrodes disposed along the second direction are disposed in each of touch electrodes, and adjacent two of the second branch electrodes in each of the function regions are intersected and electrically connected to each other; and wherein the first dummy sub-electrodes are disposed away from the first branch electrodes, the second branch electrodes are disposed near the first branch electrodes, the second branch electrodes are disposed between the first dummy sub-electrodes and the first branch electrodes.

In the touch display panel of the present application, in the first direction, the second electrodes in adjacent two of the touch units are electrically connected to each other through at least one of the second branch electrodes; and in the second direction, the first electrodes in adjacent two of the touch units are electrically connected to each other through at least one of the first branch electrodes.

In the touch display panel of the present application, the touch units further comprise second dummy sub-electrodes disposed at a periphery of the function regions, the second dummy sub-electrodes extend along the first direction and the second direction, the second dummy sub-electrodes are disposed between the first branch electrodes and the second branch electrodes; and wherein the second dummy sub-electrodes are disposed insulatively from the first branch electrodes and the second branch electrodes, and adjacent two of the second dummy sub-electrodes are disposed insulatively from each other.

In the touch display panel of the present application, a width of each of the first branch electrodes, the second branch electrodes, and the second dummy sub-electrodes along an extension direction is greater than or equal to a size of one sub-pixel.

In the touch display panel of the present application, the dummy electrodes further comprise a third dummy sub-electrode disposed in the first branch electrode and/or the second branch electrode, and an extension direction of the third dummy sub-electrode is the same as an extension direction of the first branch electrode or the second branch electrode; and wherein the third dummy sub-electrode are disposed insulatively from the first branch electrodes and/or the second branch electrodes.

In the touch display panel of the present application, the second branch electrodes in adjacent two of the function regions are electrically connected to each other through at least one metal bridge; and wherein the metal bridge is disposed in a layer different from another layer in which the first branch electrodes and the second branch electrodes are disposed.

In the touch display panel of the present application, the metal bridge and the first branch electrodes comprise a coincidence zone, and a width of each of the first branch electrodes located in the coincidence zone is less than a width of each of the first branch electrodes located outside the coincidence zone.

In the touch display panel of the present application, the first electrodes, the second electrodes, and the dummy electrodes are formed by a metal grid, the first electrodes are disposed insulatively from the second electrodes through fracture portions of the metal grid, and the dummy electrodes are disposed insulatively from the first electrodes and the second electrodes through the fracture portions of the metal grid; and wherein the metal grid is formed by a plurality of first wires and a plurality of second wires, the first wires intersects the second wires to form a plurality of meshes corresponding to at least one sub-pixel.

In the touch display panel of the present application, in the first direction, an interval between the first electrode and a first border of each of the touch units is 1 micron to 5 microns; and in the second direction, an interval between the second electrodes and a second border of each of the touch units is 1 micron to 5 microns.

In the touch display panel of the present application, in one of the touch units, an area ratio of the first electrode and the second electrode is from 35% to 75%, and an area ratio of the dummy electrodes is from 25% to 65%.

In the touch display panel of the present application, in one of the touch units, an area ratio of the first electrode is greater than an area ratio of the second electrodes; and wherein an area ratio of the first electrode is from 20% to 50%, and an area ratio of the second electrodes is from 10% to 25%.

The present application also provides a display device, the display device comprises touch display panel;

wherein the touch display panel comprises a plurality of touch units, and the touch units comprise:

a plurality of first electrode sets, the first electrode sets arranged along a first direction and extending along a second direction, each of the first electrode sets comprising a plurality of first electrodes electrically connected to one another, and the first electrodes extending along the first direction and the second direction;

a plurality of second electrode sets, the second electrode sets arranged along the second direction and extending along the first direction, each of the second electrode sets comprising a plurality of second electrodes electrically connected to one another, the second electrodes extending along the first direction and the second direction, and the second electrodes disposed insulatively from the first electrodes; and dummy electrodes, the dummy electrodes disposed insulatively from the first electrodes and the second electrodes;

wherein the first electrode sets and the second electrode sets surround and form a plurality of dummy electrode regions, the dummy electrodes are disposed in the dummy electrode regions respectively.

In the display device of the present application, the touch units are disposed along the first direction and the second direction;

in the first direction, the first electrodes in adjacent two of the touch units are disposed insulatively from each other, and the second electrodes in adjacent two of the touch units are electrically connected to each other; and in the second direction, the second electrodes in adjacent two of the touch units are disposed insulatively from each other, and the first electrodes in adjacent two of the touch units are electrically connected to each other.

In the display device of the present application, each of the touch units comprises:

at least one of the first electrodes, the first electrode dividing the touch unit into a plurality of function regions;

at least one of the second electrodes, the second electrode disposed in the function regions; and a plurality of first dummy sub-electrodes, the first dummy sub-electrodes disposed in the function regions;

wherein the first dummy sub-electrodes are disposed away from the first electrode, the second electrode is disposed near the first electrode, and the second electrode is disposed between the first dummy sub-electrodes and the first electrode.

In the display device of the present application, the first electrode comprises a plurality of first branch electrodes extending along the first direction and the second direction, the first branch electrodes are electrically connected to one another, and the first branch electrodes divide the touch unit into the function regions;

the second electrode comprises a plurality of second branch electrodes, the second branch electrodes are disposed opposite to and insulated from the first branch electrodes, at least one of the second branch electrodes disposed along the first direction and at least one of the second branch electrodes disposed along the second direction are disposed in each of touch electrodes, and adjacent two of the second branch electrodes in each of the function regions are intersected and electrically connected to each other; and wherein the first dummy sub-electrodes are disposed away from the first branch electrodes, the second branch electrodes are disposed near the first branch electrodes, the second branch electrodes are disposed between the first dummy sub-electrodes and the first branch electrodes.

In the display device of the present application, in the first direction, the second electrodes in adjacent two of the touch units are electrically connected to each other through at least one of the second branch electrodes; and in the second direction, the first electrodes in adjacent two of the touch units are electrically connected to each other through at least one of the first branch electrodes.

In the display device of the present application, the touch units further comprise second dummy sub-electrodes disposed at a periphery of the function regions, the second dummy sub-electrodes extend along the first direction and the second direction, the second dummy sub-electrodes are disposed between the first branch electrodes and the second branch electrodes; and wherein the second dummy sub-electrodes are disposed insulatively from the first branch electrodes and the second branch electrodes, and adjacent two of the second dummy sub-electrodes are disposed insulatively from each other.

Advantages

The present application provides a touch display panel and a display device, and a plurality of touch units of the touch display panel comprise: a plurality of first electrode sets arranged along a first direction and extending along a second direction, each of the first electrode sets comprising a plurality of first electrodes electrically connected to one another, the first electrode extending along the first direction and the second direction; a plurality of second electrode sets arranged along the second direction and extending along the first direction, each of the second electrode sets comprising a plurality of second electrodes electrically connected to one another, the second electrodes extending along the first direction and the second direction, the second electrodes disposed insulatively from the first electrode; dummy electrodes, the dummy electrodes disposed insulatively from the first electrode and the second electrodes; wherein in the meantime, the first electrode sets and the second electrode sets surround and form a plurality of dummy electrode regions, the dummy electrodes are disposed in the dummy electrode regions respectively. The present application, by making the first electrodes and the second electrodes along extend the same direction, increases a coupling area between the first electrodes and the second electrodes. At the same time, disposing the dummy electrodes reduces overlapping area between a finger and a corresponding touch electrode, which reduces a capacitance formed by the finger and the first electrode and the second electrodes, increases capacitance variance of the touch electrode occurring when a user touch the electrical device, and eases a technical issue of touch failure on the touch display panel.

DETAILED DESCRIPTION OF PREFERRED EMBODIMENTS

To make the objective, the technical solution, and the effect of the present application clearer and more explicit, the present application will be further described in detail below with reference to the accompanying drawings. It should be understood that the specific embodiments described here are only used to explain the present application instead of being used to limit the present application.

Figure 1:
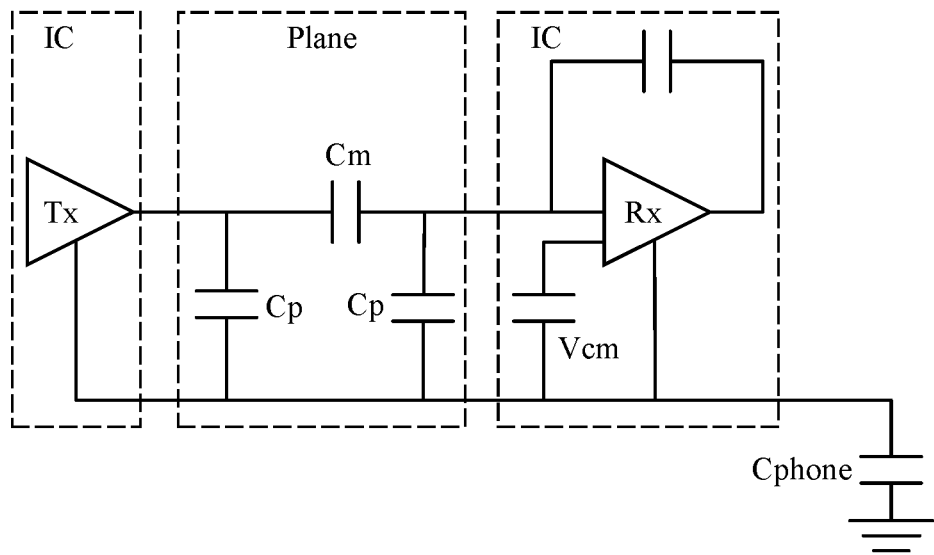
FIG. 1 is an equivalent circuit diagram of a touch display panel of the present application not receiving a touch signal.
Figure 2:
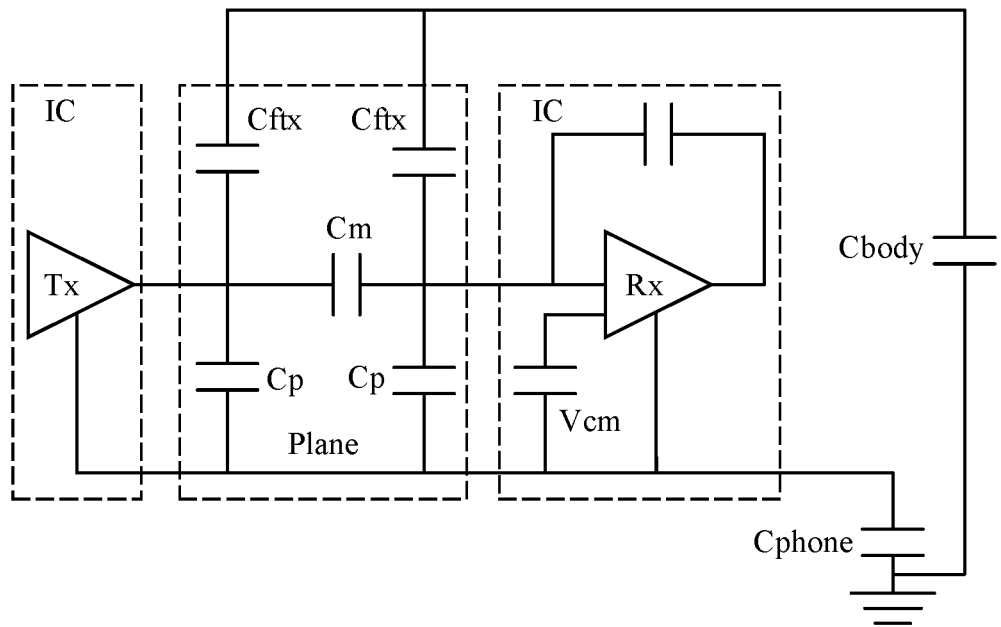
FIG. 2 is an equivalent circuit diagram of the touch display panel of the present application receiving a touch signal.

With reference to FIG. 1 and FIG. 2, FIG. 1 is an equivalent circuit diagram of a touch display panel of the present application not receiving a touch signal, and FIG. 2 is an equivalent circuit diagram of the touch display panel of the present application receiving a touch signal.

An electrical device, including first electrodes being touch sensing electrodes Rx and second electrodes being touch transmitter electrodes Tx, is employed as an example for explanation. In FIGS. 1 and 2, the first electrode and the second electrodes are controlled by a touch integrated circuit (IC), a capacitance Cm formed between the first electrode and the second electrodes belongs to the display panel, the touch circuit is connected to a grounding end through a capacitance Cphone. In FIG. 2, when a user contacts the display panel, a capacitance Cftx is formed by a first end of a user with each of the first electrode and the second electrodes. In the meantime, a second end of the user is connected to a grounding end through a capacitance Cbody. Therefore, the capacitance Cm between the first electrodes and the second electrodes is connected to the grounding end through a capacitance Cftx and a capacitance Cbody. A charge signal in the capacitance Cm will flow toward the grounding end, which lowers a capacitance value of the capacitance Cm between the first electrode and the second electrode to further identify a touch location.

Because a thickness of a protect cover lid of the conventional electrical device is reduced, namely, an interval of a touch electrode is reduced such that the capacitance Cftx formed between the finger and the touch electrode becomes greater. Therefore, charge signals transmitted from the capacitance Cm through the finger to the ground would be decreased such that the capacitance variance Cm of the touch electrode occurring when the user touches the electrical device is lowered, which results in a technical issue of touch failure on the touch display panel. The present application sets forth technical solutions as follows based on the above technical issue.

With reference to FIGS. 1 to 16, the present application provides a touch display panel 100 comprising an underlay 200 and a touch layer 300 disposed on the underlay 200. The touch layer 300 comprises a plurality of touch units 400, and the touch units 400 can comprise:

a plurality of first electrode sets 500, the first electrode sets 500 disposed along a first direction and extending along a second direction, each of the first electrode sets 500 comprises a plurality of first electrodes 10 electrically connected to one another, and the first electrode 10 extending along the first direction and the second direction;

a plurality of second electrode sets 600, the second electrode sets 600 arranged along the second direction and extending along the first direction, each of the second electrode sets 600 comprising a plurality of second electrodes 20 electrically connected to one another, the second electrodes 20 extending along the first direction and the second direction, and the second electrodes 20 disposed insulatively from the first electrode 10;

dummy electrodes 30, the dummy electrodes 30 disposed insulatively from the first electrode 10 and the second electrodes 20, the first electrode sets 500 and the second electrode sets 600 surrounding and forming a plurality of dummy electrode regions 700, and the dummy electrodes 30 disposed in the dummy electrode regions 700.

In the present embodiment, an included angle between the first direction and the second direction can range 0° to 90°. For example, with reference to FIGS. 3 and 4, the first direction can be an X direction, the second direction can be a Y direction. The included angle between the first direction X and the second direction Y can be a non-zero angle. In the following embodiment, the included angle between the first direction X and the second direction Y can be 90°. For example, the first direction X can be a horizontal direction, the second direction Y can be a vertical direction.

The present application, by extending the first electrodes 10 and second electrodes 20 along the same direction, increases a coupling area between the first electrode 10 and the second electrodes 20. In the meantime, disposing the dummy electrodes 30 reduces an overlapping area of a finger and corresponding touch electrodes, lowers a capacitance formed between the finger and the first electrodes 10 and second electrodes 20, raises capacitance variance of the touch electrodes when a user touches electrical device, and alleviates the technical issue of touch failure of on the touch display panel.

Now refer to specific embodiments to describe the technical solution of the present application.

Figure 4:
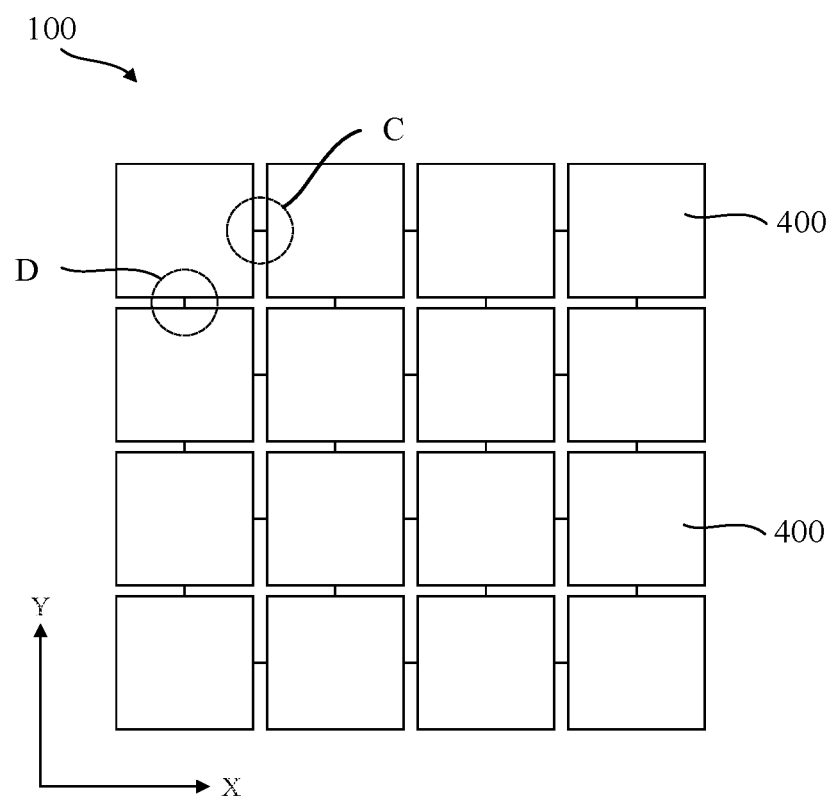
FIG. 4 is a second structural schematic view of the touch display panel of the present application.

In the present embodiment, with reference to FIG. 4, FIG. 4 is a simple structural schematic view of the touch display panel 100. The touch layer 300 can comprise the touch units 400 disposed along the first direction X and the second direction Y. A structure of touch units 400 are described first as follows.

Each of the touch units 400 can comprise:

at least one first electrode 10, the first electrode 10 dividing the touch unit 400 into a plurality of function regions 40;

at least one second electrode 20, the second electrode 20 disposed insulatively from the first electrode 10, the second electrodes 20 extending along the first direction and the second direction, the second electrodes 20 disposed opposite to the first electrode 10, and the second electrodes 20 disposed in the function regions 40;

a plurality of first dummy sub-electrodes 301, the first dummy sub-electrodes 301 disposed insulatively from the first electrode 10 and the second electrodes 20, and the first dummy sub-electrodes 301 disposed in the function regions 40.

In the present embodiment, the first dummy sub-electrodes 301 are disposed away from the first electrode 10, the second electrodes 20 are disposed near the first electrode 10, and the second electrodes 20 are disposed between the first dummy sub-electrodes 301 and the first electrode 10.

The present application, by disposing the first dummy sub-electrodes 301 away from the first electrode 10, disposing the second electrodes 20 near the first electrode 10, and disposing the second electrodes 20 between the first dummy sub-electrodes 301 and the first electrode 10. Disposing the first dummy sub-electrodes reduces an overlapping area of a finger and corresponding touch electrodes, lowers a capacitance formed between the finger and the first electrodes 10 and second electrodes 20, raises capacitance variance of the touch electrodes when a user touches electrical device, and alleviates the technical issue of touch failure of on the touch display panel.

Figure 5:
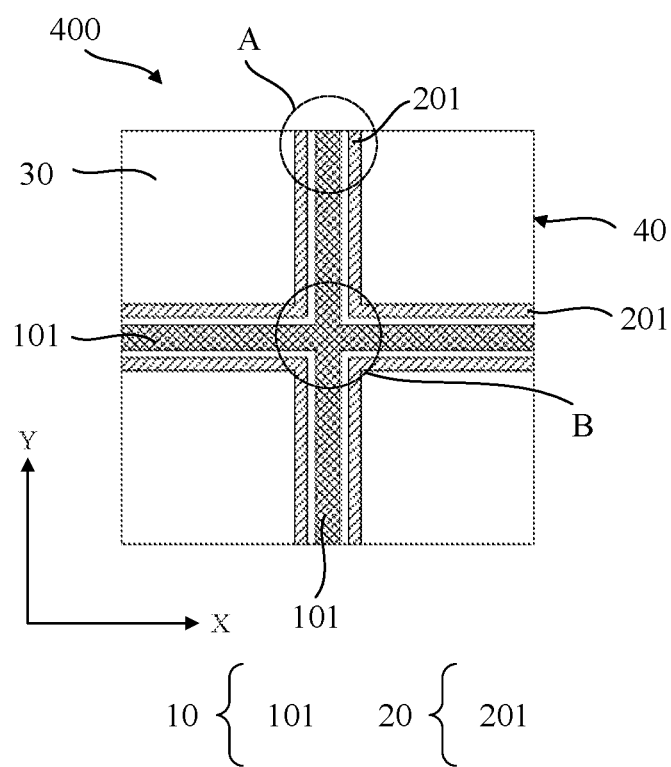
FIG. 5 is a first structural schematic view of a touch unit of the present application.
Figure 6:
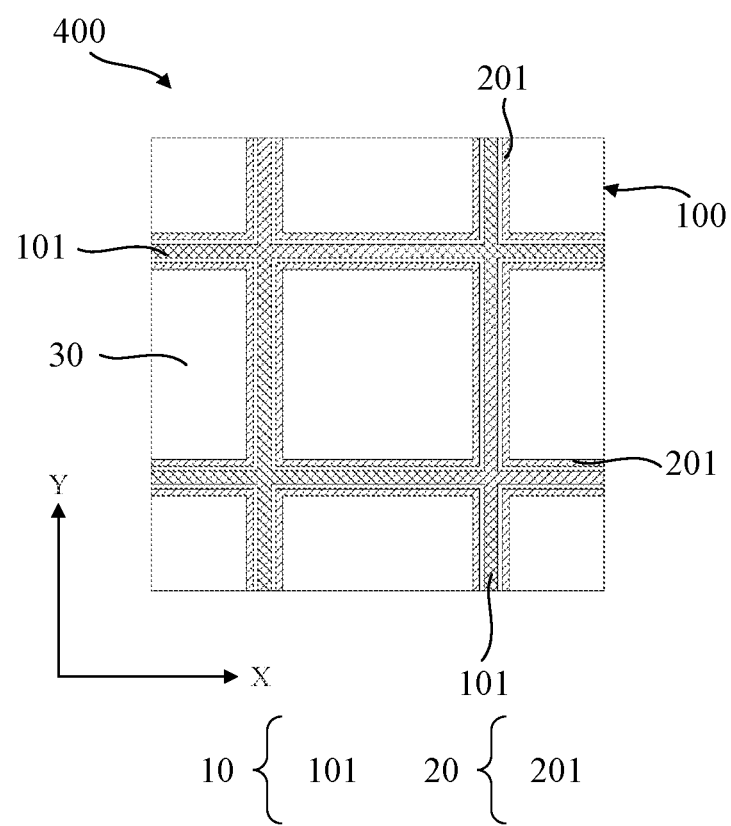
FIG. 6 is a second structural schematic view of the touch unit of the present application.
Figure 7:
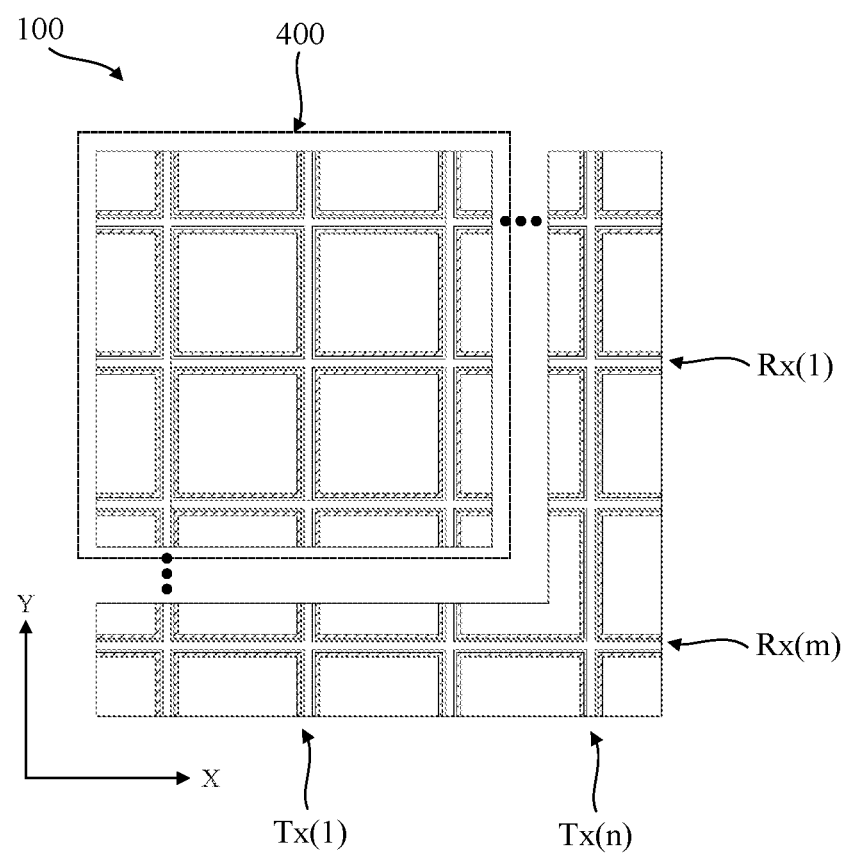
FIG. 7 is a third structural schematic view of the touch display panel of the present application.

With reference to FIGS. 5 to 7, in the touch display panel 100 of the present application, the first electrode 10 can comprise a plurality of first branch electrodes 101 extending along the first direction X and the second direction Y. The first branch electrodes 101 are electrically connected to one another, and the first branch electrodes 101 divide the touch unit 400 into the function regions 40.

The second electrodes 20 can comprise a plurality of second branch electrodes 201, the second branch electrodes 201 are disposed insulatively from and opposite to the first branch electrodes 101. At least one of the second branch electrodes 201 disposed along the first direction X and at least one of the second branch electrodes 201 disposed along the second direction Y are disposed in each of touch electrodes. Adjacent two of the second branch electrodes 201 in each of the function regions 40 are intersected and electrically connected to each other.

In the present embodiment, the first dummy sub-electrodes 301 are disposed away from the first branch electrodes 101, the second branch electrodes 201 are disposed near the first branch electrodes 101, and the second branch electrodes 201 are disposed between the first dummy sub-electrodes 301 and the first branch electrodes 101.

With reference to FIG. 5, FIG. 5 is a first structural schematic view of the touch unit 400 of the present application. the first electrode 10 can comprise one first branch electrode 101 extending along the first direction X and one first branch electrode 101 extending along the second direction Y. The two first branch electrodes 101 divide the touch unit 400 into four function regions 40. One second branch electrode 201 extending along the first direction X and one second branch electrode 201 extending along the second direction Y are disposed in each of the function regions 40. The second branch electrodes 201 in the same function regions 40 are intersected and are electrically connected to each other. The two second branch electrodes 201 are disposed perpendicularly. The second branch electrodes 201 in different ones of the function regions 40 can be electrically connected to each other through at least one metal bridge 202. The metal bridge 202 can be disposed in a layer different from another layer in which the first branch electrodes 101 and the second branch electrodes 201 are disposed. Furthermore, a remaining region in the function regions 40 is the first dummy sub-electrodes 301, the first dummy sub-electrodes 301 are disposed insulatively from the second branch electrodes 201.

With reference to FIG. 6, FIG. 6 is a second structural schematic view of the touch units of the present application. The first electrode can comprise two first branch electrodes 101 extending along the first direction X and two first branch electrodes 101 extending along the second direction Y, the four first branch electrodes 101 divide the touch unit 400 into nine function regions 40. One second branch electrode 201 extending along the first direction X and one second branch electrode 201 extending along the second direction Y are disposed in the four function regions 40 on a top corner of an outer periphery. A disposing manner of the two second branch electrodes 201 is the same as the structure shown in FIG. 5. Two second branch electrodes 201 extending along the first direction X and one second branch electrode 201 extending along the second direction Y are disposed in the four function regions 40 of a central region of the outer periphery. An area of the function region 40 surrounded by the four first branch electrodes 101 is greater than that of the function regions 40 of the outer periphery. The second branch electrodes 201 disposed in the function regions 40 disposed in an internal are annular and are disposed insulatively from the first branch electrodes 101 of the outer periphery. A remaining region of each of the function regions 40 is the first dummy sub-electrodes 301, and the first dummy sub-electrodes 301 are disposed insulatively from the second branch electrodes 201.

With reference to FIG. 7, FIG. 7 is a third structural schematic view of the touch display panel of the present application. the first electrode 10 can comprise three first branch electrodes 101 extending along the first direction X and three first branch electrodes 101 extending along the second direction Y, the six first branch electrodes 101 divide the touch unit 400 into sixteen function regions 40. One second branch electrode 201 extending along the first direction X and one second branch electrode 201 extending along the second direction Y are disposed in an outer periphery of the function regions A disposing manner of the two second branch electrodes 201 is the same as the structure as shown in FIG. 5. An area of the function region 40 surrounded by the six first branch electrodes 101 is larger than that of the function regions 40 located in the outer periphery. The second branch electrodes 201 of the function regions 40 disposed in the internal can be annular and are disposed insulatively from the first branch electrodes 101 on the outer periphery. A remaining region of each of the function regions 40 is the first dummy sub-electrodes 301, the first dummy sub-electrodes 301 are disposed insulatively from the second branch electrodes 201.

Similarly, on the basis of FIGS. 5 to 7, the first electrode 10 can further comprise first branch electrodes 101 of an amount of n extending along the first direction X and first branch electrodes 101 of an amount of m extending along the second direction Y, the first branch electrodes 101 of the amount of (n+m) divide the touch unit 400 into the function regions 40 of an amount of (n+1)*(m+1). Specific values of n and m are not limited by the present application.

In the structures in FIGS. 5 to 7, because the first branch electrodes 101 are disposed along the first direction X and the second direction Y, namely, the first electrodes 10 are conducted horizontally and vertically. Because the second branch electrodes 201 are disposed along the first direction X and the second direction Y, disposing the metal bridge 202 makes the horizontally and vertically disposed second electrodes 20 be conducted horizontally and vertically, horizontally and vertically conducted transmission paths reduce a channel resistance of the first electrode 10 and the second electrodes 20, which increases a current transmission efficiency in channels in the first electrode 10 and the second electrodes 20 and enhances touch sensitivity of the display device.

In the meantime, the first branch electrodes 101 and the second branch electrodes 201 arranged abreast along the first direction X and the second direction Y. The second branch electrodes 201 surround the first branch electrodes 101 to increase a coupling area of the first electrodes 10 and the second electrodes 20, which can effectively increase variation and variation ratio of touch signals occurring when a finger touches the display device to further increase the touch sensitivity of the display device.

Furthermore, the first dummy sub-electrodes 301 occupy a larger area in the touch unit 400, namely, an area occupied by the first electrode and the second electrodes 20 is reduced. Because the first dummy sub-electrodes 301 are disposed insulatively from the first electrodes 10 and the second electrodes 20, when a user's finger touches the display device, an overlapping area of a finger and corresponding touch electrodes is reduced, a capacitance formed between the finger and the first electrodes 10 and second electrodes 20 is lowered, capacitance variance of the touch electrodes when a user touches electrical device is increased, and the technical issue touch failure of the touch display panel is alleviated.

Figure 3:
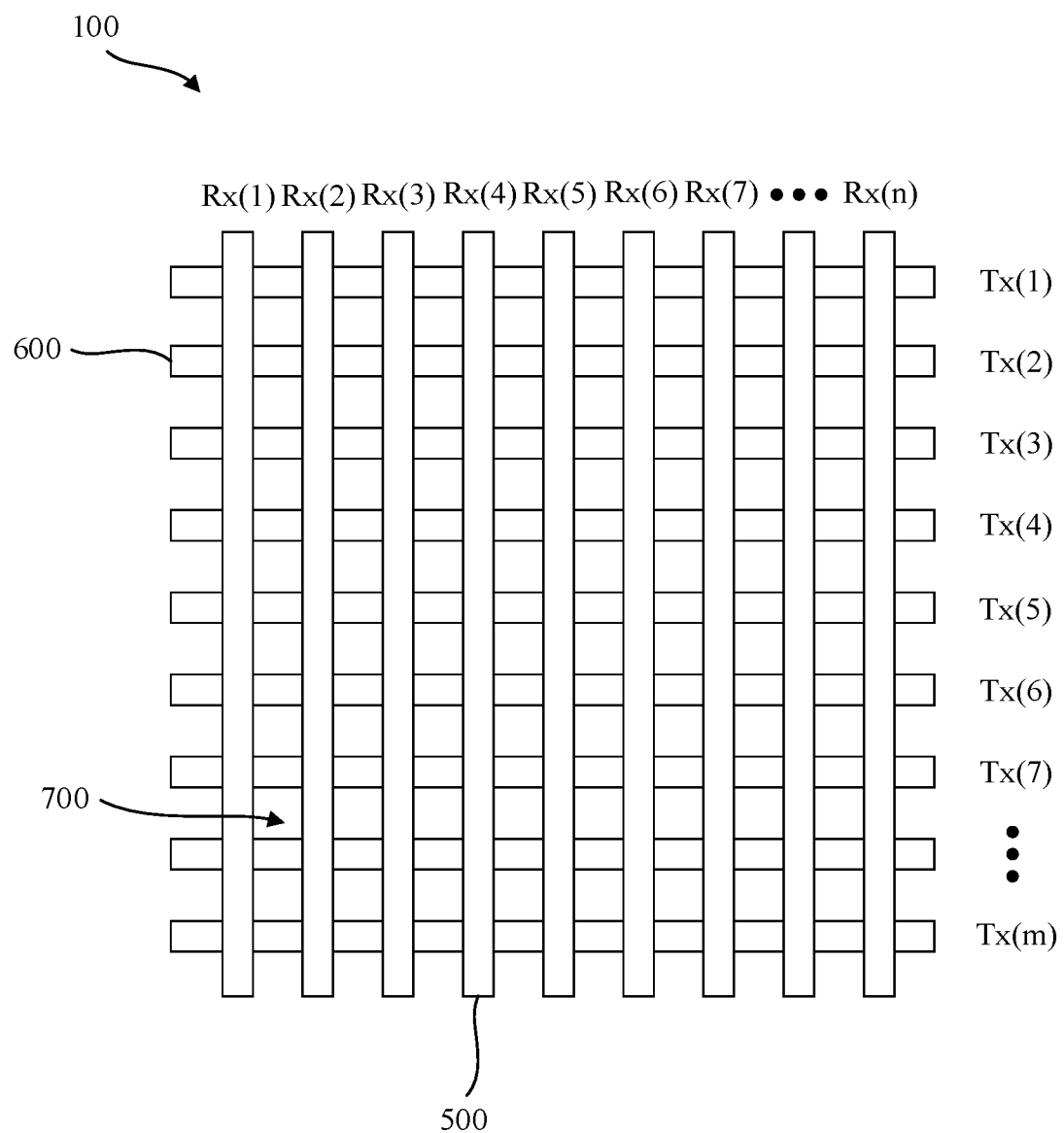
FIG. 3 is a first structural schematic view of the touch display panel of the present application.

With reference to FIGS. 3 and 7, the touch display panel 100 can comprise the first electrode sets 500 of an amount of n extending along the first direction X, adjacent two of the first electrode sets 500 are disposed insulatively from each other. Each of the first electrode sets 500 can comprise first electrodes 10 of an amount of m arranged along the second direction Y. The touch display panel 100 can further comprise the second electrode sets 600 of an amount of m arranged along the second direction Y, adjacent two of the second electrode sets 600 are disposed insulatively from each other. Each of the second electrode sets 600 can comprise second electrodes 20 of an amount of n arranged along the first direction X. For example, when the first electrodes 10 are touch sensing electrodes Rx and the second electrodes 20 are touch transmitter electrodes Tx, as shown in FIG. 7, a first column of the first electrode sets 500 is Rx(1), an $n^{th}$ column of the first electrode sets 500 is Rx(n), a first row of the second electrode sets 600 is Tx(1), and an $m^{th}$ row of the second electrode sets 600 is Tx(m).

With reference to FIGS. 5 to 7, in the touch display panel 100 of the present application, the touch unit 400 further comprises second dummy sub-electrodes 302 disposed on an outer periphery of the function regions 40. The second dummy sub-electrodes 302 extend along the first direction X and the second direction Y. The second dummy sub-electrodes 302 are disposed between the first branch electrodes 101 and the second branch electrodes 201.

In the present embodiment, the second dummy sub-electrodes 302 are disposed insulatively from the first branch electrodes 101 and the second branch electrodes 201, and adjacent two of the second dummy sub-electrodes 302 are disposed insulatively from each other.

For example, with reference to FIG. 6, one second dummy sub-electrode 302 along the first direction X and one second dummy sub-electrode 302 along the second direction Y are disposed in the function regions located in the outer periphery of the touch unit 400. Four second dummy sub-electrodes 302 are disposed in the function regions 40 located in the touch unit 400, one second dummy sub-electrode 302 corresponds to one second branch electrode 201. The second dummy sub-electrodes 302 are disposed between the second branch electrodes 201 and the first branch electrodes 101. The second dummy sub-electrodes 302 are disposed insulatively from the adjacent first branch electrodes 101 and second branch electrodes 201. Namely, the second dummy sub-electrodes 302 make the adjacent first branch electrodes 101 and the second branch electrodes 201 insulated from each other.

In the present embodiment, disposing the second dummy sub-electrodes 302 increases an interval between the first electrodes 10 and the second electrodes 20, and therefore it is equivalent to reducing the mutual capacitance between the first electrodes 10 and second electrodes 20. Because a variation ratio of touch signals of the touch display panel 100 is a variance of the mutual capacitance between the first electrodes 10 and the second electrodes 20 to the mutual capacitance between the first electrodes 10 and second electrodes 20, under a circumstance of reduction of the mutual capacitance between the first electrodes 10 and second electrodes 20, it is equivalent to reduction of a denominator. Namely, the variation ratio of the touch signals of the touch display panel 100 increases to improve the touch sensitivity of the touch display panel 100.

Figure 8:
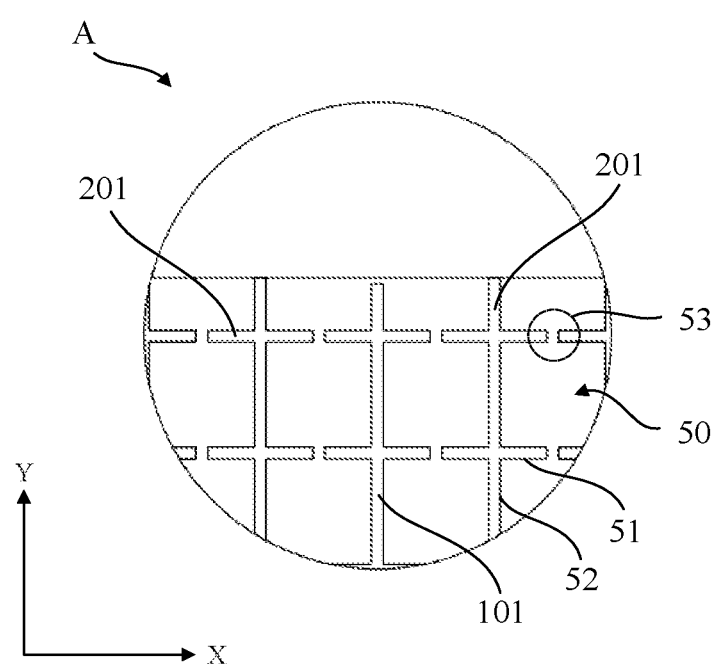
FIG. 8 is a first enlarged schematic view of a region A in FIG. 5.
Figure 9:
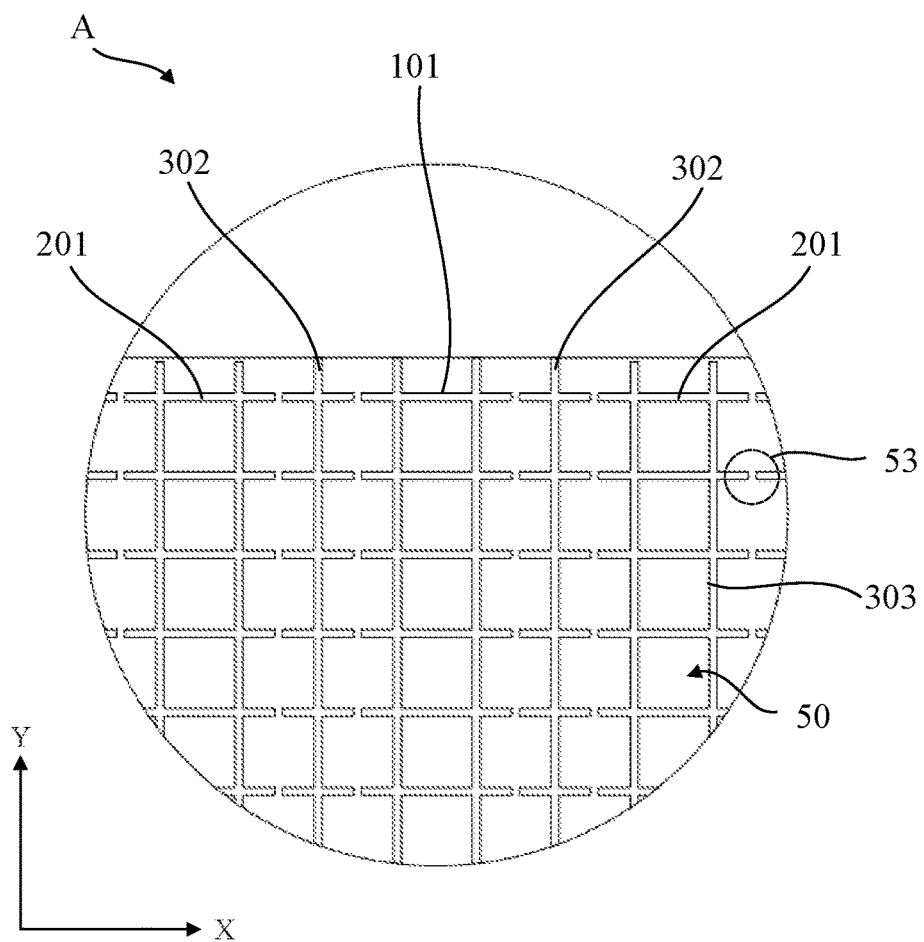
FIG. 9 is a second enlarged schematic view of the region A in FIG. 5.
Figure 10:
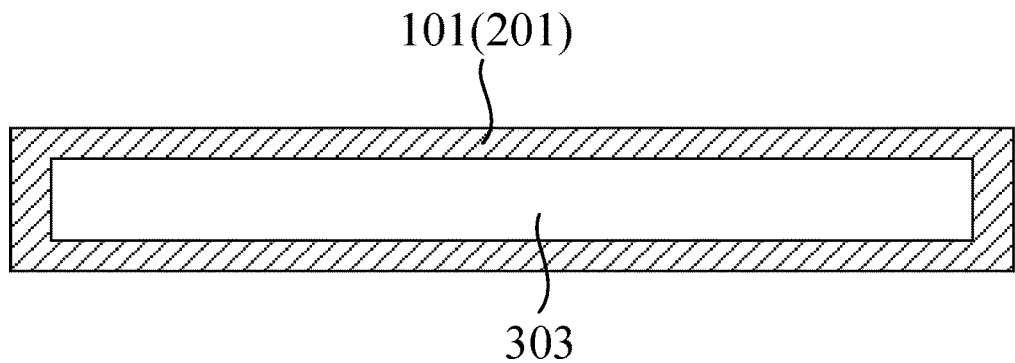
FIG. 10 is a simplified structural schematic view of first branch electrodes or second branch electrodes of the present application.

With reference to FIGS. 8 to 10, in the touch display panel 100 of the present application, the first electrode 10, the second electrodes 20, and the dummy electrodes 30 are formed by a metal grid. The first electrode 10 are disposed insulatively from the second electrodes 20 through fracture portions 53 of the metal grid. The dummy electrodes 30 are disposed insulatively from the first electrode 10 and the second electrodes 20 through the fracture portions 53 of the metal grid.

In the present embodiment, the metal grid is formed by a plurality of first wires 51 and a plurality of second wires 52. The first wires 51 and the second wires 52 intersect to form a plurality of meshes 50 corresponding to at least one sub-pixel. One mesh 50 corresponds to at least one sub-pixel. Specifically, to increase the touch sensitivity of the touch display panel 100, one mesh 50 can correspond to one sub-pixel.

In the present embodiment, a width of the first branch electrodes 101, a width of the second branch electrodes 201, and a width of the second dummy sub-electrodes 302 along an extension direction is greater than or equal to a size of one sub-pixel.

With reference to FIG. 8, FIG. 8 is a first enlarged schematic view of a region A in FIG. 5. A width of each of the first branch electrodes 101, the second branch electrodes 201, and the second dummy sub-electrodes 302 along the extension direction can be the size of one sub-pixel. The first branch electrodes 101, the second branch electrodes 201, and the second dummy sub-electrodes 302 in the region A extend along the second direction Y, the meshes surrounded by adjacent two of the first branch electrodes 101 and the second dummy sub-electrodes 302 correspond to the sub-pixels. The meshes surrounded by adjacent two of the first branch electrodes 101 and the second dummy sub-electrodes 302 correspond to the sub-pixels. Adjacent ones of the first branch electrodes 101, the second branch electrodes 201, and the second dummy sub-electrodes 302 can be disposed insulatively from one another through the fracture portions 53. The fracture portions 53 can be disposed between adjacent two of the meshes 50.

In the present embodiment, the first branch electrodes 101, the second branch electrodes 201, and the second dummy sub-electrodes 302 can form an entire surface of metal through a metal deposition process and pattern the entire surface of metal to form a plurality of first wires 51 extending along the first direction X and a plurality of second wires 52 extending along the second direction Y by an etching process. Fracture portions 53 on the first wires 51 and second wires 52 make the first wires 51 and the second wires 52 to form insulatively disposed first electrodes 10, second electrodes 20, and dummy electrodes 30. In the meantime, because a size of the area has a certain influence on a resistance of a conductor, internals of the vertically and horizontally disposed electrodes can be hollowed during the etching process to form metal wires disposed oppositely with heads and tails thereof connected to reduce the area of the electrode, which lowers the resistance of the electrode, increases a current transmission efficiency in channels in the first electrode 10 and the second electrodes 20, and enhances touch sensitivity of the display device.

In the present embodiment, a material of first wires 51 and the second wires 52 can be titanium aluminum titanium.

With reference to FIG. 9, FIG. 9 is a second enlarged schematic view of the region A in FIG. 5. The width of the first branch electrodes 101 and the width of the second branch electrodes 201 along the extension direction can be a size of two sub-pixels, and the width of the second dummy sub-electrodes 302 along the extension direction can be a size of one sub-pixel.

A difference between the structure shown in FIG. 9 and the structure shown in FIG. 8 is that: in each of the first branch electrodes 101 or each of the second branch electrodes 201, a third dummy sub-electrode 303 located on an outer periphery of each of the meshes 50 exists. An extension direction of the third dummy sub-electrode 303 is the same as the extension direction of a corresponding one of the first branch electrodes 101 or the second branch electrodes 201. The third dummy sub-electrode 303 is disposed insulatively from the first branch electrode 101 and/or the second branch electrode 201, and adjacent two of the third dummy sub-electrodes 303 are disposed insulatively from each other.

With reference to FIG. 9, when an etching process is implemented on the first branch electrodes 101 and the second branch electrodes 201, because metal in the electrode is removed to retain metal wire of the outer periphery. However, the metal wire surrounding the meshes 50 is not connected to the metal wire of the outer periphery to form the third dummy sub-electrode 303 disposed insulatively from a corresponding branch electrode. Disposing the third dummy sub-electrode 303 reduces the area occupied by the first electrode 10 or the second electrodes 20 in one touch unit 400. When the user contacts the touch display device, a capacitance formed between the finger and the first electrodes 10 and second electrodes 20 is reduced, capacitance variance of the touch electrodes when the user contacts the electrical device is increased, which alleviates the technical issue of touch failure on the touch display panel.

With reference to FIG. 10, FIG. 10 is a simplified structural schematic view of first branch electrodes of the present application. the first branch electrodes 101. A width of each of the second branch electrodes 201 along an extension direction can be a size of three sub-pixels, a width of each of the second dummy sub-electrodes 302 along an extension direction can be a size of on sub-pixel. The dummy electrodes 30 further comprise the third dummy sub-electrode 303 disposed in the first branch electrode 101 and/or the second branch electrode 201. The third dummy sub-electrode 303 is disposed continuously along the corresponding extension direction. The extension direction corresponding to the third dummy sub-electrode 303 is the same as the extension direction corresponding to the first branch electrode 101 or the second branch electrode 201. The third dummy sub-electrode 303 is disposed insulatively from the first branch electrode 101 and/or the second branch electrode 201.

In the present embodiment, a structure of the third dummy sub-electrode 303 is similar to a structure of the second dummy sub-electrode 302, both are continuous electrodes, and are disposed insulatively from the first branch electrode 101 and the second branch electrode 201 through fracture portions 53 between adjacent meshes 50. The first branch electrode 101 or the second branch electrode 201 in FIG. 10 are annular, and and surround the third dummy sub-electrode 303. Compared to the structure in FIG. 9, the area occupied by the third dummy sub-electrode 303 in FIG. 10 is greater than the area occupied by the third dummy sub-electrode 303 in FIG. 9, which further increase a ratio of the dummy electrodes 30 in the touch unit 400, reduces the area occupied by first electrode 10 or the second electrodes 20 in one touch unit 400, further increases capacitance variance when the user contacts the electrical device, and alleviates the technical issue of touch failure of the touch display panel.

In the present embodiment, to prevent an over large interval between the first branch electrode 101 and the second branch electrode 201 to affect the mutual capacitance between the first electrode 10 and the second electrodes 20, a channel width of the third dummy sub-electrode 303 would not exceed a size of two sub-pixels.

In the touch display panel 100 of the present application, the meshes 50 can comprise first meshes 50 corresponding to red sub-pixels, second meshes 50 corresponding to green sub-pixels, and third meshes 50 corresponding to blue sub-pixels.

In the present embodiment, along a direction of a top view of the touch display panel 100, a width of the metal grid forming the second meshes 50 is less than a width of the metal grid forming the first meshes 50, and the width of the metal grid forming the first meshes 50 is less than a width the metal grid of forming the third meshes 50.

Because light emitting materials of different colors in an organic light emitting display panel have different light emitting efficiencies and lifespans, to guarantee consistency of the light emitting efficiencies and lifespans of a red sub-pixel, a green sub-pixel, and a blue sub-pixel, usually an area of the blue sub-pixel is the largest, an area of the green sub-pixel is smallest. Therefore, a greater spare area exists in an outer periphery of the green sub-pixel. The present application disposes more metal wires in an outer periphery of the green sub-pixel and the red sub-pixel to fill the spare area. For example, a metal wire insulated from the first branch electrodes 101 or the second branch electrodes 201 is disposed in the meshes 50 corresponding to the red sub-pixel and the green sub-pixel to form a corresponding dummy sub-electrode, which increases an area ratio of the dummy sub-electrode in the touch unit 400 and increases capacitance variance when the user touches the electrical device. Because the area of the green sub-pixel is the smallest, therefore a metal grid width of an outer periphery of the meshes 50 corresponding to the green sub-pixel is the greatest. The area of the green sub-pixel is the greatest, therefore a metal grid width of an outer periphery of the meshes 50 corresponding to the blue sub-pixel is the smallest.

Figure 11:
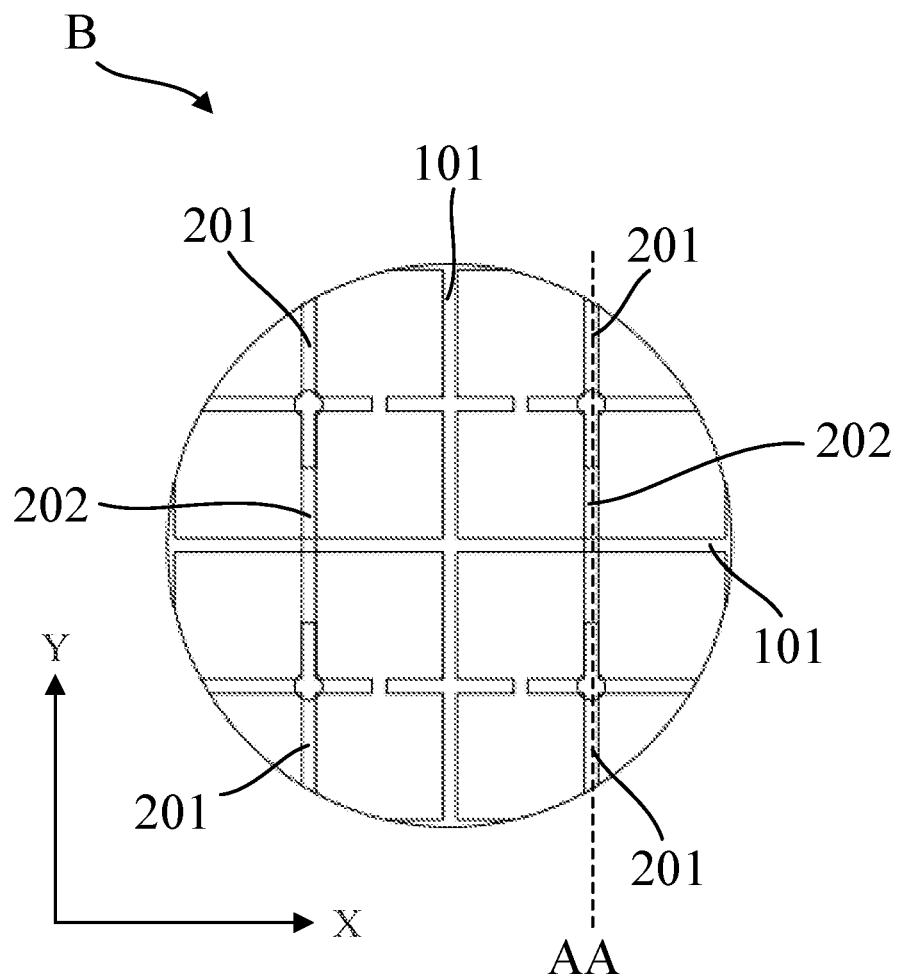
FIG. 11 is a first enlarged schematic view of a region B in FIG. 5.
Figure 12:
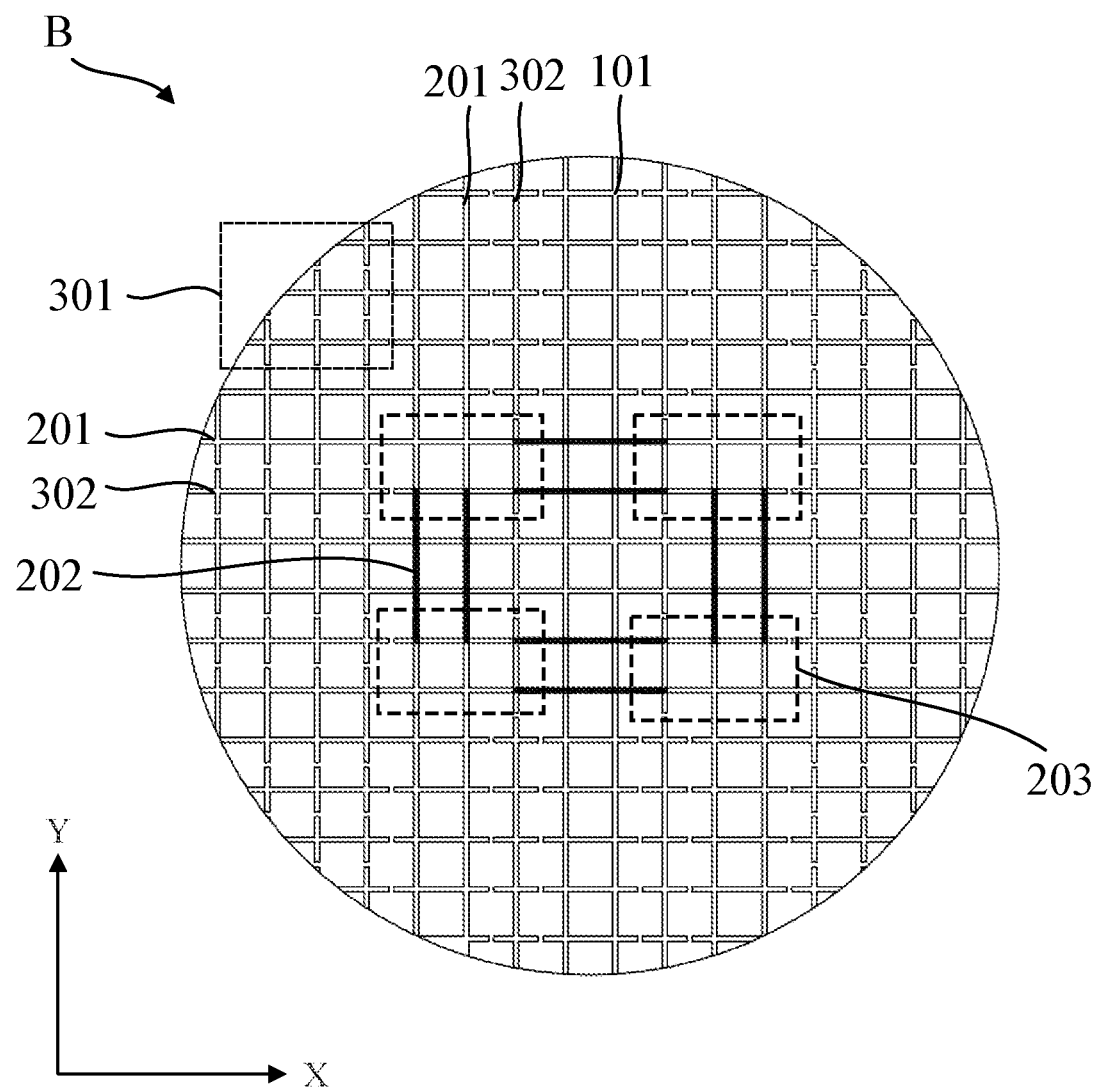
FIG. 12 is a second enlarged schematic view of the region B in FIG. 5.
Figure 13:
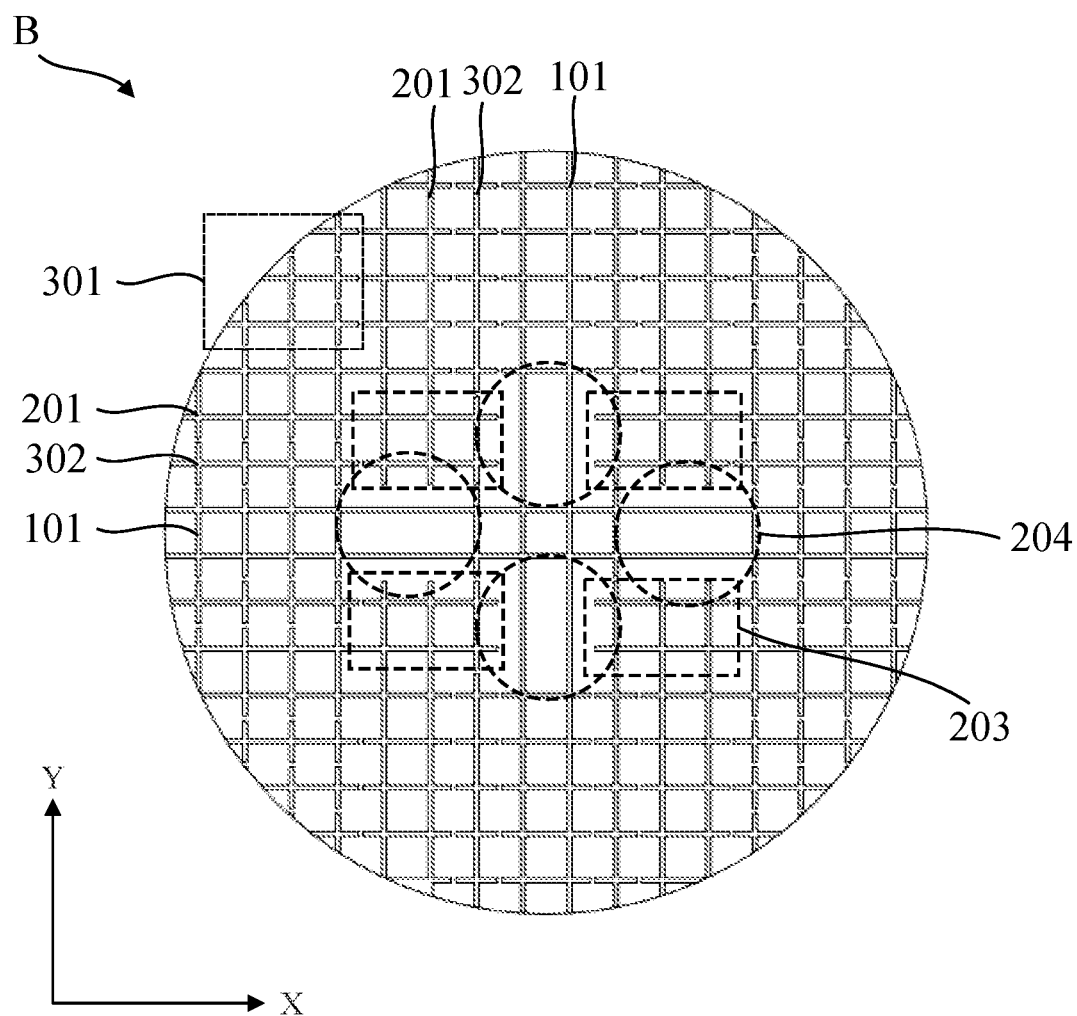
FIG. 13 is a third enlarged schematic view of the region B in FIG. 5.

With reference to FIGS. 11 to 13, in the touch display panel 100 of the present application, the metal bridge 202 and the first branch electrodes 101 have a coincidence zone, a width of the first branch electrodes 101 in the coincidence zone is less than a width of the first branch electrodes 101 in a non-coincidence zone.

With reference to FIG. 11, FIG. 11 is a first enlarged schematic view of a region B in FIG. 5. In the first direction X, the second branch electrodes 201 in adjacent two of the function regions 40 are not electrically connected to each other through the metal bridge 202. In the second direction Y, adjacent two of the second branch electrodes 201 are electrically connected to each other through one metal bridge 202. To reduce a resistance of the metal bridge 202, the present embodiment hollows an internal of the metal bridge 202 such that the metal bridge 202 forms a closed metal coil electrically connected to the adjacent second branch electrodes 201.

With reference to FIG. 12, FIG. 12 is a second enlarged schematic view of the region B in FIG. 5. In first direction X and second direction Y, adjacent two of the are electrically connected to each other through the metal bridge 202. To prevent breakage of the metal bridge 202, the present embodiment does not hollow an internal of the metal bridge 202 such that the metal bridge 202 forms a metal strip electrically connected to the adjacent second branch electrodes 201.

Furthermore, for the structure in FIG. 12, because a second dummy sub-electrode 302 exists between the first branch electrode 101 and between second branch electrodes 201, the metal bridge 202 needs to cross over the second dummy sub-electrodes 302 to connect the adjacent two second branch electrodes 201, which results in an over large length of the metal bridge 202 and disadvantages current transmission in channels of the second electrodes 20. Therefore, the second branch electrode 201 further comprises an extension portion 203 extending toward the first branch electrodes 101. The extension portion 203 abuts the first branch electrodes 101 and is disposed insulatively from fracture portions 53 of the metal grid and the first branch electrodes 101. The metal bridge, by connecting with the extension portion 203 in adjacent two of the second branch electrodes 201, conducts adjacent two of the second branch electrodes 201.

In the structures in FIGS. 11 and 12, because the metal bridge 202 conducts the second branch electrodes 201 in the function regions 40, the metal bridge 202 can serve as a first portion of the second electrodes 20. Because the metal bridge 202 crosses over the first branch electrodes 101 to connect the adjacent two second branch electrodes, the metal bridge 202 intersects the first branch electrodes 101, and both would form a parasitic capacitance to affect the mutual capacitance of the first electrode 10 and the second electrodes 20.

With reference to FIG. 13, FIG. 13 is a third enlarged schematic view of the region B in FIG. 5. Taking the structure in FIG. 12 as an example, FIG. 13 is an enlarged view with removal of the metal bridge 202 in FIG. 12. In a coincident region 204 between the metal bridge 202 and the first branch electrodes 101, the first branch electrodes 101 only comprise first wires 51 extending along the first direction X, and second wires 52 disposed along the second direction Y are removed, which reduces an overlapping area between the metal bridge 202 and the first branch electrodes 101 to further lower a parasitic capacitance formed between the metal bridge 202 and the first branch electrodes 101 such that a touch sensitivity of the touch display panel 100 can be improved.

Figure 14:
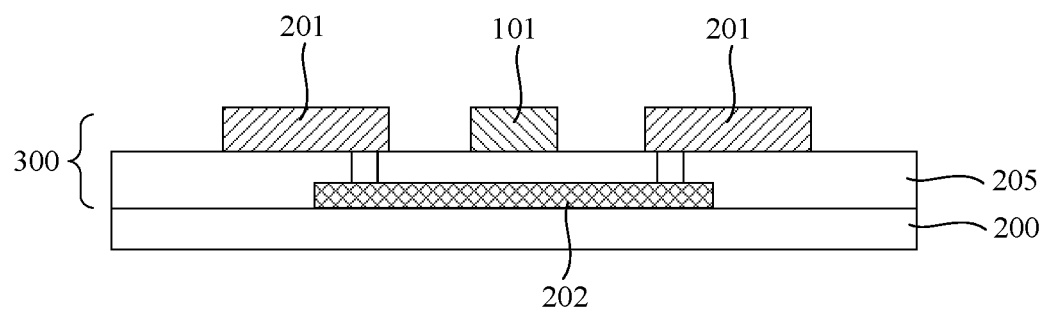
FIG. 14 is a cross-sectional schematic view along a cross-sectional line AA in FIG. 11.

With reference to FIG. 14, FIG. 14 is a cross-sectional schematic view along a cross-sectional line AA in FIG. 5. The touch unit 400 can comprise an underlay 200, a metal bridge 202 located on the underlay 200, an insulation layer 205 located on the metal bridge 202, and the first branch electrodes 101 and the second branch electrodes 201 located on the insulation layer 205. The metal bridge 202 electrically connect the two second branch electrodes 201 disposed on two sides of the first branch electrodes 101. The adjacently disposed second branch electrodes 201 can be connected to each other through one or more metal bridges 202. For example, in the structure as shown in FIG. 11, the adjacently disposed second branch electrodes 201 can be connected through one metal bridge 202. For example, in the structure as shown in FIG. 12, the adjacently disposed second branch electrodes 201 can be connected to each other through two metal bridges 202. In the present embodiment, the first branch electrodes 101 and the second branch electrodes 201 can be located between the underlay 200 and the insulation layer 205, and the present application has no limit thereto.

With reference to FIG. 4, in the touch display panel 100 of the present application, the touch layer 300 comprises a plurality of touch units 400 disposed along the first direction X and the second direction Y. In the first direction X, the first electrodes 10 in adjacent two of the touch units 400 are disposed insulatively from each other, the second electrodes 20 in adjacent two of the touch units 400 are electrically connected to each other. In the second direction Y, the second electrodes 20 in adjacent two of the touch units 400 are disposed insulatively from each other, and the first electrodes 10 in adjacent two of the touch units 400 are electrically connected to each other.

Specifically, in the first direction X, the second electrodes 20 in adjacent two of the touch units 400 can electrically connected to each other through at least one of the second branch electrodes 201. In the second direction Y, the first electrodes 10 in adjacent two of the touch units 400 can be electrically connected through the at least one of the first branch electrodes 101.

Figure 15:
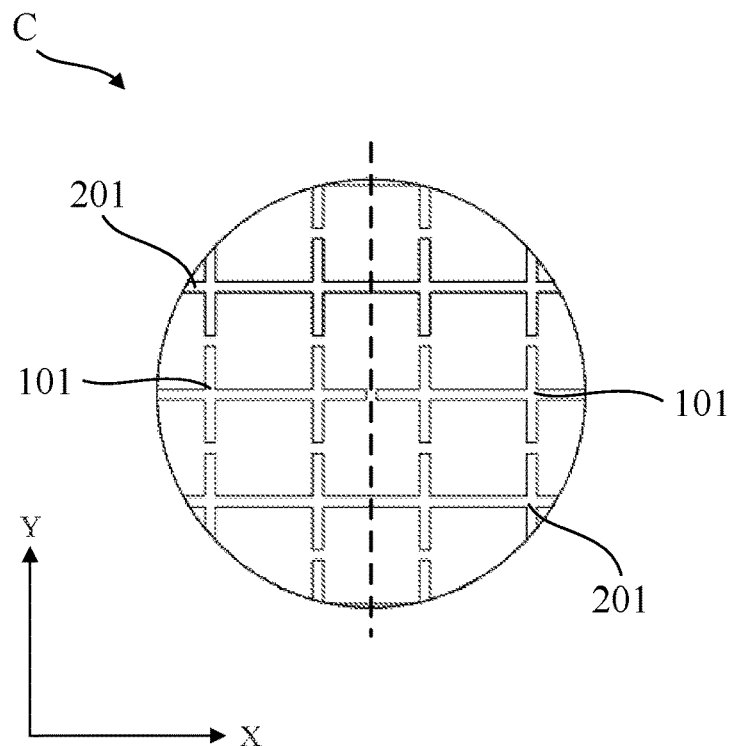
FIG. 15 is an enlarged schematic view of a region C in FIG. 4.

With reference to FIG. 15, FIG. 15 is an enlarged schematic view of a region C in FIG. 4. In the first direction X, the first branch electrodes 101 in adjacent two of the touch units 400 are disposed insulatively from each other. Namely, the first branch electrodes 101 in adjacent two of the touch units 400 are disposed insulatively from each other through fracture portions 53 of the metal grid. The second branch electrodes 201 in adjacent two of the touch units 400 are electrically connected to each other. Namely, no fracture portion 53 exists between the second branch electrodes 201 in adjacent two of the touch units 400, the second branch electrodes 201 are electrically connected to each other. Furthermore, because the first dummy sub-electrodes 301 are disposed insulatively from the first branch electrodes 101 and the second branch electrodes 201, therefore, in the first direction X, the present application can have no specific limit to whether the first dummy sub-electrodes 301 in adjacent two of the touch units 400 are connected to each other. In the disclosed structure in FIG. 15, the first dummy sub-electrodes 301 in adjacent two of the touch units 400 are electrically connected to each other.

Figure 16:
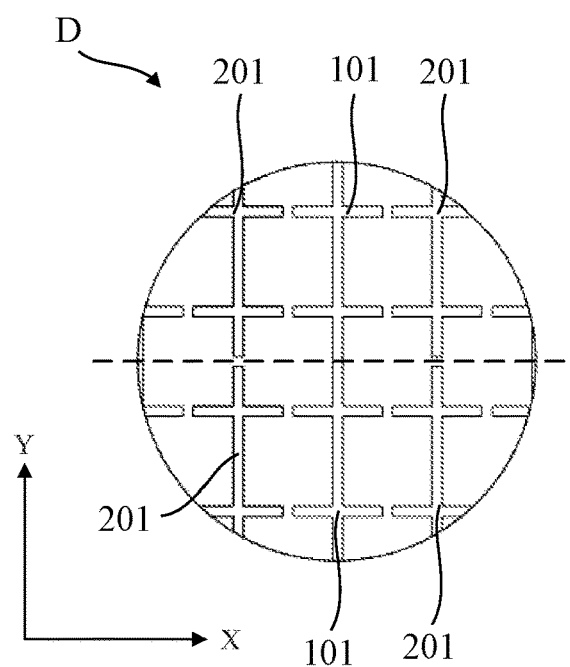
FIG. 16 is an enlarged schematic view of a region D in FIG. 4.

With reference to FIG. 16, FIG. 16 is an enlarged schematic view of a region D in FIG. 4. In the second direction Y, the second branch electrodes 201 in adjacent two of the touch units 400 are disposed insulatively from each other. Namely, the second branch electrodes 201 in adjacent two of the touch units 400 are disposed insulatively from each other through fracture portions 53 of the metal grid. The first branch electrodes 101 in adjacent two of the touch units 400 are electrically connected to each other. Namely, no fracture portions 53 exist between the first branch electrodes 101 in adjacent two of the touch units 400, the first branch electrodes 101 are electrically connected to each other. Furthermore, because the first dummy sub-electrodes 301 are disposed insulatively from the first branch electrodes 101 and the second branch electrodes 201, therefore, in the second direction Y, the present application has no specific limit to whether the first dummy sub-electrodes 301 in adjacent two of the touch units 400 are connected to each other. In the disclosed structure in FIG. 16, the first dummy sub-electrodes 301 in adjacent two of the touch units 400 are not electrically connected to each other.

In the structures of FIGS. 15 and 16, fragmentation of the touch units 400 can make the second electrodes 20 disposed along the first direction X conducted along the first direction X. Namely, adjacent two rows of the second electrodes 20 are disposed insulatively from each other. The first electrode 10 disposed along the second direction Y are conducted along the second direction Y. Namely, adjacent two columns of the first electrode 10 are disposed insulatively from each other. Furthermore, because the first dummy sub-electrodes 301 and the first branch electrodes 101 and the second branch electrodes 201 are disposed insulatively from each other, in the first direction X and the second direction Y, the present application has no limit to whether the first dummy sub-electrodes 301 are connected.

In the touch display panel 100 of the present application, to prevent the first electrodes 10 or the second electrodes 20 in the touch units 400 from shorting, the first electrodes 10 or the second electrodes 20 in adjacent ones of the touch units 400 are required to be disposed with a safety distance therebetween. For example, in the first direction X, an interval between the first electrode 10 and a first border of each of the touch units 400 can be 1 micron to 5 microns. In the second direction Y, an interval between the second electrodes 20 and a second border of each of the touch units 400 can be 1 micron to 5 microns.

In the touch display panel 100 of the present application, disposing the dummy electrodes 30 can reduce an overlapping area of the finger and the corresponding touch electrodes, which lowers a capacitance formed by the finger and the first electrodes 10 and the second electrodes 20. However, an over large area of the dummy electrodes 30 would influence a mutual capacitance between the first electrodes 10 and the second electrodes which lowers a touch sensitivity of the touch display panel 100.

For example, with reference to FIG. 2, use of dummy electrodes lowers the area of the first electrode and the second electrodes, and simultaneously reduces the capacitance Cm between the first electrode and the second electrodes. A contact area between the user's finger and the first electrode and the second electrodes is reduced, namely, the capacitance Cftx is reduced. Therefore, charge signals from the capacitance Cm through the finger to the ground is increased such that capacitance variance Cm of the touch electrode increases when the user touches the electrical device. When the area of the dummy electrodes is further increased, the capacitance Cm between the first electrode and the second electrodes is further decreased. However, because the capacitance Cm is too low, capacitance variance Cm would be limited, which results in the technical issue of touch failure on the touch display panel. Therefore, an area ratio of the dummy electrodes cannot be too high.

In the present embodiment, in one of the touch units 400, an area ratio of the first electrode 10 and the second electrodes 20 is from 35% to 75%, an area ratio of the dummy electrodes 30 is from 25% to 65%.

In the present embodiment, the first electrode 10 can be one of the touch sensing electrodes or the touch transmitter electrodes. The second electrodes 20 can be the other of touch sensing electrodes or the touch transmitter electrodes. For example, when the first electrode 10 can be touch sensing electrodes and the second electrodes 20 can be touch transmitter electrodes, a touch performance of the touch display panel 100 is measured according to the following two sets of experimental data.

In a first set of experimental data, an area ratio of touch sensing electrodes is 11.6%, an area ratio of touch transmitter electrodes is 25%, and the area ratio of dummy electrodes 30 is 63.4%;

In a second set of experimental data, the area ratio of the touch sensing electrodes is 23.2%, the area ratio of the touch transmitter electrodes is 50%, and the area ratio of the dummy electrodes 30 is 26.8%;

According to the measurement result, because the dummy electrodes 30 in the touch display panel 100 corresponding to the first set of experimental data over-occupies to lower a mutual capacitance between the first electrode s 10 and the second electrodes 20 such that touch sensitivity of the touch display panel 100 is decreased, touch performance of the touch display panel 100 corresponding to the second set of experimental data is better.

In the present embodiment, an area ratio of the first electrode 10 is greater than an area ratio of the second electrodes 20. The area ratio of the first electrode 10 is from 20% to 50%, and an area ratio of the second electrodes 20 is from 10% to 25%.

In the present embodiment, for the organic light emitting display panel, because the touch layer 300 is usually disposed on the thin film encapsulation layer, when the area ratio of the touch sensing electrodes is greater than the area ratio of the touch transmitter electrodes, the less the area ratio of the touch transmitter electrodes is, the less the parasitic capacitance between the touch transmitter electrodes and a cathode layer in the light emitting function layer is. Furthermore, because a length of a channel of the touch transmitter electrodes is greater than a length of a channel of the touch sensing electrodes, a width of the channel of the touch transmitter electrodes would be decreased when the area ratio of the touch sensing electrodes is greater than the area ratio of the touch transmitter electrodes, which facilitates reduction of the parasitic capacitance of entire channels of the touch transmitter electrodes. Finally, the touch transmitter electrodes serve as driving electrodes, a smaller parasitic capacitance can increase a scan frequency of the touch transmitter electrodes, reduce signal attenuation of a driving signal resulting from resistances and capacitances, which further raises a report rate of the touch device.

According to still another aspect of the present application, a display device is also provided, and the display device comprises the touch display panel. The display device includes but is not limited to mobile phones, tablet computers, computer monitors, game consoles, televisions, display screens, wearable devices, and other household appliances or household appliances with display functions, etc.

A working principle of the electronic device is similar to a working principle of the touch display panel, the specific working principle of the electronic device can refer to the working principle of the touch display panel and will not be described repeatedly herein.

The present application provides a touch display panel and a display device, and a plurality of touch units of the touch display panel comprise: a plurality of first electrode sets arranged along a first direction and extending along a second direction, each of the first electrode sets comprising a plurality of first electrodes electrically connected to one another, the first electrodes extend along the first direction and the second direction; a plurality of second electrode sets arranged along the second direction and extending along the first direction, each of the second electrode sets comprises a plurality of second electrodes electrically connected to one another, the second electrodes extend along the first direction and the second direction, the second electrodes are disposed insulatively from the first electrode; dummy electrodes, the dummy electrodes are disposed insulatively from the first electrodes and the second electrodes; wherein in the meantime, the first electrode sets and the second electrode sets surround and form a plurality of dummy electrode regions, the dummy electrodes are disposed in the dummy electrode regions respectively. The present application, by making the first electrodes and the second electrodes extend along the same direction increases a coupling area between the first electrodes and the second electrodes. At the same time, disposing the dummy electrodes reduces an overlapping area between a finger and a corresponding touch electrode, which reduces a capacitance formed by the finger and the first electrode and the second electrodes, increases capacitance variance of the touch electrode occurring when a user touch the electrical device, and alleviates a technical issue of touch failure on the touch display panel.

It can be understood that for a person of ordinary skill in the art, equivalent replacements or changes can be made according to the technical solution of the present application and its inventive concept, and all these changes or replacements should belong to the scope of protection of the appended claims of the present application.

What is claimed is:

1. A touch display panel, comprising a plurality of touch units, the touch units comprising:
    a plurality of first electrode sets, wherein the first electrode sets are arranged along a first direction and extending along a second direction, each of the first electrode sets comprises a plurality of first electrodes electrically connected to one another, the first electrodes extend along the first direction and the second direction, and the first electrode sets are formed in a grid pattern comprising a plurality of rectangular hollow regions arranged in an array;
    a plurality of second electrode sets, wherein the second electrode sets are arranged along the second direction and extend along the first direction, each of the second electrode sets comprises a plurality of second electrodes electrically connected to one another, the second electrodes extend along the first direction and the second direction, the second electrodes are disposed insulatively from the first electrodes, the second electrode sets are disposed in the rectangular hollow regions of the grid respectively, and each of the second electrode sets is formed as a rectangular loop; and dummy electrodes, wherein the dummy electrodes are disposed insulatively from the first electrodes and the second electrodes;

wherein the first electrode sets and the second electrode sets surround and form a plurality of rectangular dummy electrode regions corresponding to the rectangular hollow regions, and the dummy electrodes are disposed in the rectangular dummy electrode regions.

2. The touch display panel as claimed in claim 1, wherein the touch units are disposed along the first direction and the second direction;

in the first direction, the first electrodes in adjacent two of the touch units are disposed insulatively from each other, and the second electrodes in adjacent two of the touch units are electrically connected to each other; and in the second direction, the second electrodes in adjacent two of the touch units are disposed insulatively from each other, and the first electrodes in adjacent two of the touch units are electrically connected to each other.

3. The touch display panel as claimed in claim 2, wherein each of the touch units comprises:

at least one of the first electrodes, the first electrode dividing the touch unit into a plurality of function regions;

at least one of the second electrodes, the second electrode disposed in the function regions; and a plurality of first dummy sub-electrodes, the first dummy sub-electrodes disposed in the function regions;

wherein the first dummy sub-electrodes are disposed away from the first electrode, the second electrode is disposed near the first electrode, and the second electrode is disposed between the first dummy sub-electrodes and the first electrode.

4. The touch display panel as claimed in claim 3, wherein the first electrode comprises a plurality of first branch electrodes extending along the first direction and the second direction, the first branch electrodes are electrically connected to one another, and the first branch electrodes divide the touch unit into the function regions;

the second electrode comprises a plurality of second branch electrodes, the second branch electrodes are disposed opposite to and insulated from the first branch electrodes, at least one of the second branch electrodes disposed along the first direction and at least one of the second branch electrodes disposed along the second direction are disposed in each of the second touch electrodes, and adjacent two of the second branch electrodes in each of the function regions are intersected and electrically connected to each other; and wherein the first dummy sub-electrodes are disposed away from the first branch electrodes, the second branch electrodes are disposed near the first branch electrodes, the second branch electrodes are disposed between the first dummy sub-electrodes and the first branch electrodes.

5. The touch display panel as claimed in claim 4, wherein in the first direction, the second electrodes in adjacent two of the touch units are electrically connected to each other through at least one of the second branch electrodes; and in the second direction, the first electrodes in adjacent two of the touch units are electrically connected to each other through at least one of the first branch electrodes.

6. The touch display panel as claimed in claim 4, wherein the touch units further comprise second dummy sub-electrodes disposed at a periphery of the function regions, the second dummy sub-electrodes extend along the first direction and the second direction, and the second dummy sub-electrodes are disposed between the first branch electrodes and the second branch electrodes; and wherein the second dummy sub-electrodes are disposed insulatively from the first branch electrodes and the second branch electrodes, and adjacent two of the second dummy sub-electrodes are disposed insulatively from each other.

7. The touch display panel as claimed in claim 6, wherein a width of each of the first branch electrodes, the second branch electrodes, and the second dummy sub-electrodes along an extension direction is greater than or equal to a size of one sub-pixel.

8. The touch display panel as claimed in claim 4, wherein the dummy electrodes further comprise a third dummy sub-electrode disposed in the first branch electrode and/or the second branch electrode, and an extension direction of the third dummy sub-electrode is same as an extension direction of the first branch electrode or the second branch electrode; and wherein the third dummy sub-electrode is disposed insulatively from the first branch electrodes and/or the second branch electrodes.

9. The touch display panel as claimed in claim 4, wherein the second branch electrodes in adjacent two of the function regions are electrically connected to each other through at least one metal bridge; and wherein the metal bridge is disposed in a layer different from a layer in which the first branch electrodes and the second branch electrodes are disposed.

10. The touch display panel as claimed in claim 9, wherein the metal bridge and the first branch electrodes comprise a coincidence zone, and a width of each of the first branch electrodes located in the coincidence zone is less than a width of each of the first branch electrodes located outside the coincidence zone.

11. The touch display panel as claimed in claim 1, wherein the first electrodes, the second electrodes, and the dummy electrodes are formed by a metal grid, the first electrodes are disposed insulatively from the second electrodes through fracture portions of the metal grid, and the dummy electrodes are disposed insulatively from the first electrodes and the second electrodes through the fracture portions of the metal grid; and wherein the metal grid is formed by a plurality of first wires and a plurality of second wires, the first wires intersect the second wires to form a plurality of meshes corresponding to at least one sub-pixel.

12. The touch display panel as claimed in claim 1, wherein in the first direction, an interval between the first electrode and a first border of each of the touch units is 1 micron to 5 microns; and in the second direction, an interval between the second electrodes and a second border of each of the touch units is 1 micron to 5 microns.

13. The touch display panel as claimed in claim 1, wherein in one of the touch units, an area ratio of the first electrodes and the second electrodes is from 35% to 75%, and an area ratio of the dummy electrodes is from 25% to 65%.

14. The touch display panel as claimed in claim 1, wherein in one of the touch units, an area ratio of the first electrode is greater than an area ratio of the second electrodes; and wherein an area ratio of the first electrode is from 20% to 50%, and an area ratio of the second electrodes is from 10% to 25%.

15. A display device, wherein the display device comprises a touch display panel;
wherein the touch display panel comprises a plurality of touch units, and the touch units comprise:
a plurality of first electrode sets, wherein the first electrode sets are arranged along a first direction and extend along a second direction, each of the first electrode sets comprises a plurality of first electrodes electrically connected to one another, the first electrodes extend along the first direction and the second direction, and the first electrode sets are formed in a grid pattern comprising a plurality of rectangular hollow regions arranged in an array;
a plurality of second electrode sets, wherein the second electrode sets are arranged along the second direction and extending along the first direction, each of the second electrode sets comprises a plurality of second electrodes electrically connected to one another, the second electrodes extend along the first direction and the second direction, the second electrodes are disposed insulatively from the first electrodes, the second electrode sets are disposed in the rectangular hollow regions of the grid respectively, and each of the second electrode sets is formed as a rectangular loop; and
dummy electrodes, wherein the dummy electrodes are disposed insulatively from the first electrodes and the second electrodes;
wherein the first electrode sets and the second electrode sets surround and form a plurality of rectangular dummy electrode regions corresponding to the rectangular hollow regions, the dummy electrodes are disposed in the rectangular dummy electrode regions respectively.

16. The display device as claimed in claim 15, wherein the touch units are disposed along the first direction and the second direction; wherein
in the first direction, the first electrodes in adjacent two of the touch units are disposed insulatively from each other, and the second electrodes in adjacent two of the touch units are electrically connected to each other; and
in the second direction, the second electrodes in adjacent two of the touch units are disposed insulatively from each other, and the first electrodes in adjacent two of the touch units are electrically connected to each other.

17. The display device as claimed in claim 16, wherein each of the touch units comprises:
at least one of the first electrodes, the first electrode dividing the touch unit into a plurality of function regions;
at least one of the second electrodes, the second electrode disposed in the function regions; and
a plurality of first dummy sub-electrodes, the first dummy sub-electrodes disposed in the function regions;
wherein the first dummy sub-electrodes are disposed away from the first electrode, the second electrode is disposed near the first electrode, and the second electrode is disposed between the first dummy sub-electrodes and the first electrode.

18. The display device as claimed in claim 17, wherein the first electrode comprises a plurality of first branch electrodes extending along the first direction and the second direction, the first branch electrodes are electrically connected to one another, and the first branch electrodes divide the touch unit into function regions;
the second electrode comprises a plurality of second branch electrodes, the second branch electrodes are disposed opposite to and insulated from the first branch electrodes, at least one of the second branch electrodes disposed along the first direction and at least one of the second branch electrodes disposed along the second direction are disposed in each of the second touch electrodes, and adjacent two of the second branch electrodes in each of the function regions are intersected and electrically connected to each other; and
wherein the first dummy sub-electrodes are disposed away from the first branch electrodes, the second branch electrodes are disposed near the first branch electrodes, the second branch electrodes are disposed between the first dummy sub-electrodes and the first branch electrodes.

19. The display device as claimed in claim 18, wherein in the first direction, the second electrodes in adjacent two of the touch units are electrically connected to each other through at least one of the second branch electrodes; and
in the second direction, the first electrodes in adjacent two of the touch units are electrically connected to each other through at least one of the first branch electrodes.

20. The display device as claimed in claim 18, wherein the touch units further comprise second dummy sub-electrodes disposed at a periphery of the function regions, the second dummy sub-electrodes extend along the first direction and the second direction, and the second dummy sub-electrodes are disposed between the first branch electrodes and the second branch electrodes; and
wherein the second dummy sub-electrodes are disposed insulatively from the first branch electrodes and the second branch electrodes, and adjacent two of the second dummy sub-electrodes are disposed insulatively from each other.

* * * * *